US012163833B2

(12) United States Patent
Sadek Radwan et al.

(10) Patent No.: US 12,163,833 B2
(45) Date of Patent: Dec. 10, 2024

(54) LARGE SPOT SIZE SPECTROMETER

(71) Applicant: Si-Ware Systems, Cairo (EG)

(72) Inventors: Mohamed Sadek Radwan, Cairo (EG); Shady Labib, Cairo (EG); Mostafa Medhat, Cairo (EG); Bassem Mortada, Cairo (EG); Tarek Mohamed Zeinah, Cairo (EG); Yasser M. Sabry, Cairo (EG); Bassam Saadany, Cairo (EG); Mohamed H. Al Haron, Cairo (EG); Mohamed Ahmed Gaber, Cairo (EG)

(73) Assignee: SI-WARE SYSTEMS, Cairo (EG)

( * ) Notice: Subject to any disclaimer, the term of this patent is extended or adjusted under 35 U.S.C. 154(b) by 269 days.

(21) Appl. No.: 17/828,747

(22) Filed: May 31, 2022

(65) Prior Publication Data

US 2022/0390277 A1 Dec. 8, 2022

Related U.S. Application Data

(60) Provisional application No. 63/195,696, filed on Jun. 1, 2021.

(51) Int. Cl.
G01J 3/02 (2006.01)
G01J 3/42 (2006.01)
G01J 3/453 (2006.01)

(52) U.S. Cl.
CPC ............ G01J 3/0208 (2013.01); G01J 3/0229 (2013.01); G01J 3/0272 (2013.01); G01J 3/42 (2013.01);
(Continued)

(58) Field of Classification Search
CPC ...... G01J 3/0208; G01J 3/0229; G01J 3/0272; G01J 3/42; G01J 3/4532; G01J 2003/425
See application file for complete search history.

(56) References Cited

U.S. PATENT DOCUMENTS 6,424,416 B1 * 7/2002 Gross .................. G01J 3/46
356/419
7,133,726 B1 * 11/2006 Atwood ................ H10N 10/13
137/66
(Continued)

FOREIGN PATENT DOCUMENTS

CN 112557368 A * 3/2021 ............. G01N 21/65
CN 212646452 U * 3/2021 ............. G01N 21/25
(Continued)

OTHER PUBLICATIONS

International Search Report & Written Opinion, PCT/US2022/031772, Sep. 15, 2022.
(Continued)

Primary Examiner — Michelle M Iacoletti
Assistant Examiner — Noah J. Haney
(74) Attorney, Agent, or Firm — LOZA & LOZA, LLP; Holly L. Rudnick

(57) ABSTRACT

Aspects relate to an optical device providing a large spot size spectrometer. The optical device includes an optical head, an optical window, and a spectrometer. The optical head includes a plastic molded part having an aperture and a plurality of reflectors around the aperture formed therein. Each reflector may include a respective lamp assembled therein. The optical window is configured to receive a sample, to pass input light from the lamps to the sample and to pass scattered light from the sample towards the aperture. The aperture is configured to filter a first portion of scattered light containing unusable sample information and to pass a second portion of the scattered light to the spectrometer.

24 Claims, 13 Drawing Sheets

(52) U.S. Cl.
CPC ....... *G01J 3/4532* (2013.01); *G01J 2003/425* (2013.01)

(56) References Cited

U.S. PATENT DOCUMENTS

| | | | |
|---|---|---|---|
| 10,060,791 B2 | 8/2018 | Sabry et al. | |
| 2005/0229698 A1* | 10/2005 | Beecroft | G01J 3/0264 73/300 |
| 2008/0204757 A1* | 8/2008 | Manning | G01N 21/1702 356/451 |
| 2013/0256534 A1* | 10/2013 | Micheels | G01N 21/8507 250/339.07 |
| 2016/0033328 A1* | 2/2016 | Walters | G01J 3/0289 356/326 |
| 2016/0246002 A1 | 8/2016 | Saadany et al. | |
| 2017/0336319 A1* | 11/2017 | Hruska | G01J 3/26 |
| 2018/0172510 A1* | 6/2018 | Rosen | G01J 3/0205 |
| 2022/0196472 A1* | 6/2022 | Siess | G01N 21/255 |
| 2023/0366734 A1* | 11/2023 | Palmer | G01J 3/10 |

FOREIGN PATENT DOCUMENTS

| | | | |
|---|---|---|---|
| DE | 102019216130 A1 | 4/2021 | |
| EP | 3467478 A1 * | 4/2019 | ........... G01J 3/0205 |
| WO | 2014078426 A1 | 5/2014 | |

OTHER PUBLICATIONS

Claire McVey, et al., "A rapid food chain approach for authenticity screening: The development, validation and transferability of a chemometric model using two handheld near infrared spectroscopy (NIRS) devices", Talanta, Elsevier B.V., 2020, https://doi.org/10.1016/j.talanta.2020.121533.

Krzysztof B. Bec, et al., "Principles and Applications of Miniaturized Near-Infrared (NIR) Spectrometers", Chemistry-A European Journal, Wiley-VCH GmbH, Weinheim, Chem. Eur. J. 2021, 27, 1514-1532, doi.org/10.1002/chem.202002838.

Ruben F. Kranenburg, et al., "The importance of wavelength selection in on-scene identification of drugs of abuse with portable near-infrared spectroscopy", Forensic Chemistry 30 (2022) 100437, Elsevier B.V., 2022, https://doi.org/10.1016/j.forc.2022.100437.

Yijia Tang, et al., "Evaluating low-cost portable near infrared sensors for rapid analysis of soils from South Eastern Australia", Geoderma Regional 20 (2020) e00240, Elsevier B.V., 2019, https://doi.org/10.1016/j.geodrs.2019.e00240.

* cited by examiner

LARGE SPOT SIZE SPECTROMETER

PRIORITY CLAIM

This application claims priority to and the benefit of Provisional Application No. 63/195,696, filed in the U.S. Patent and Trademark Office on Jun. 1, 2021, the entire content of which is incorporated herein by reference as if fully set forth below in its entirety and for all applicable purposes.

TECHNICAL FIELD

The technology discussed below relates generally to optical spectroscopy including diffuse reflectance infrared spectroscopy, and in particular, to mechanisms to increase the spectrometer spot size.

BACKGROUND

A spectrometer measures a single-beam spectrum (e.g., a power spectral density (PSD)). The intensity of the single-beam spectrum is proportional to the power of the radiation reaching the detector. Diffuse reflectance spectroscopy may be utilized to study the molecular structure of a given material based on its spectral response. In diffuse reflectance spectroscopy, a light source (e.g., a wide band light source) directs incident light to the material. The incident light interacts with the material such that part of the light is transmitted, another part of the light is reflected, and another part of the light is scattered. The scattered portion is affected by the sample absorption spectrum and can be used to identify the material based on its spectral print. Diffuse reflectance spectroscopy can be used with different forms of the material, such as solids, powders, and liquids.

Various types of diffuse reflectance samples can have different interactions with the incident light dependent on the shape, scattering properties and absorption cross section of the sample. For example, samples may be categorized into two main types. The first type includes homogeneous, uniformly packed samples, in which the sample particles are small enough and uniformly distributed across the whole sample area. With homogenous samples, no spectral variations in scattering and absorption properties exist between different locations of the sample. In addition, the sample may completely and uniformly cover the optical window, and therefore, there may be no observable gaps between the window and the sample. Most liquids and powders fall into this category. The second type includes inhomogeneous, randomly packed samples in which the sample is composed of relatively large granules with dimensions of a few millimeters. The scattering and absorption properties can vary within the same granule and from one granule to another. In addition, granules can have irregular shapes and can be randomly placed on the optical window with different orientation and non-uniform packing. This introduces air gaps between the different granules. Generally, part of the light escapes between the gaps while the rest of the light hits the granule in different positions, which may result in measurement errors and/or low diffuse reflected power. Examples of inhomogeneous samples include grains and feed samples.

Miniaturized (e.g., handheld) near infrared (NIR) spectrometers may have limited optical spot size, usually smaller than 3 mm in diameter. In this case, the system should be equipped with an accessory to perform spatial averaging, such as a rotating sampling cup or petri dish. However, this is at the expense of the measurement time and the complexity of the whole measuring system.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to mechanisms for increasing the spot size of a miniaturized spectrometer. Examples relate to optical devices including a micro-electro-mechanical system (MEMS) based Fourier Transform infrared (FTIR) spectrometer with an optical spot size between 3 mm and 20 mm working across the spectral range of 1350 nm to 2500 nm. The optical device further includes an optical head including a plurality of miniaturized filament-based incandescent lamps and reflective optics (e.g., reflectors) surrounding the lamps for illumination. The lamps are placed in certain positions with respect to the sample to provide a large spot size (e.g., a large sample illumination pattern), while a holding element (e.g., a plastic molded part) is used to hold the lamps and reflectors in their positions. For example, the reflectors may be formed within the plastic molded part and coated with a metallic coating, while the lamps may be assembled within the reflectors. The plastic molded part may further include an aperture configured to pass scattered light from the sample into the spectrometer, while also limiting the unwanted coupled rays into the spectrometer to maximize the coupling efficiency based on the spot size. In some examples, the plastic molded part is further used to hold an optical coupling element (e.g., a lens) responsible for the collection of the scattered light from the sample. The optical device may further include a protective transparent optical window covering the optical head and providing the optical interface with the sample. In some examples, the optical head is assembled with the spectrometer package using alignment pins to maintain negligible alignment errors.

In an example, an optical device is disclosed. The optical device includes an optical head including a plastic molded part, an aperture formed within the plastic molded part, a plurality of reflectors formed within the plastic molded part around the aperture, and a plurality of lamps, with each lamp of the plurality of lamps being assembled within a respective one of the plurality of reflectors. The optical device further includes an optical window positioned on the optical head. The optical window is configured to receive a sample, to pass input light from the plurality of lamps to the sample, and to pass scattered light scattered from the sample towards the aperture. The aperture has a shape and a diameter configured to filter a first portion of the scattered light and to pass a second portion of the scattered light, where the first portion of the scattered light contains unusable sample information. The optical device further includes a spectrometer configured to receive the second portion of the scattered light at an input thereof and to obtain a spectrum of the sample based on the second portion of the scattered light.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
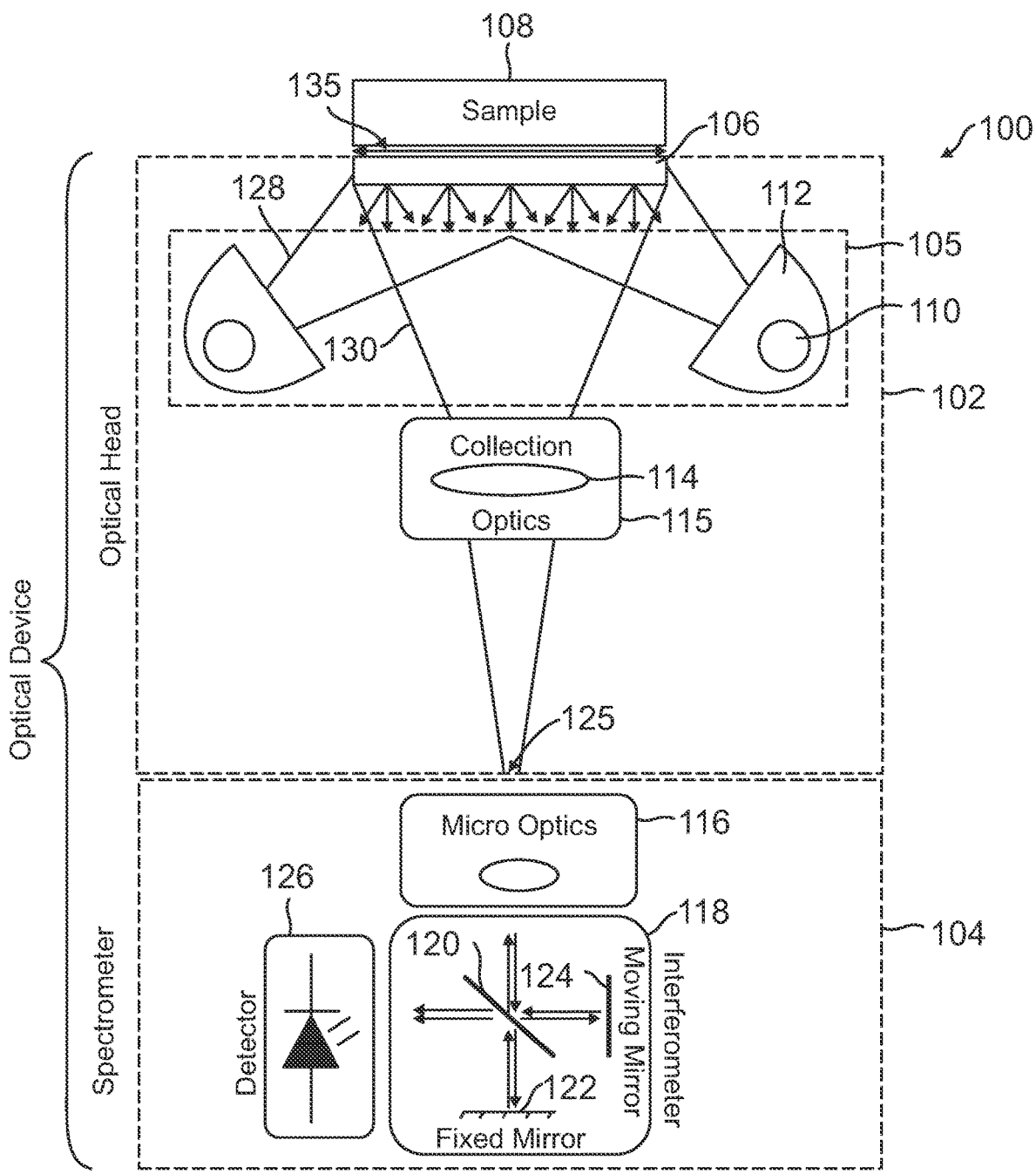
FIG. 1 is a diagram illustrating an optical device including an optical head and a large spot size spectrometer according to some aspects.

FIG. 1 is a diagram illustrating an optical device 100 including an optical head 102 and a large spot size spectrometer 104 according to some aspects. In some examples, the optical device may be a portable, handheld device. The optical device 100 further includes an optical window 106 configured to receive a sample 108 (e.g., a grain or feed sample). The optical head 102 includes an illumination unit 105 that includes a plurality of lamps 110 (e.g., incandescent lamps), each assembled within a respective one of a plurality of reflectors 112. The optical window 106 allows input light 128 from the illumination unit 105 to pass through to the sample 108. The incident light 128 interacts with the sample 108 such that part of the light is transmitted, another part of the light is reflected, and another part of the light is scattered by the sample 108. The scattered light 130 is affected by the sample absorption spectrum and can be used to identify the sample 108.

The light 128 radiated from each of the lamps 110 is distributed over all solid angles. Each reflector 112 redirects the light from a corresponding one of the lamps 110 to the sample 108 to form an illumination pattern of a desired optical spot size 135 on the sample 108. The number of lamps 110 and corresponding reflectors 112 is variable and may be selected, for example, based on the desired optical spot size 135. For example, the optical head 102 may include between three and seven lamps 110 to achieve a spot size diameter between 3 mm and 20 mm working across the spectral range of 1350 nm to 2500 nm. The number of lamps 110 may further be selected to control the intensity profile and prevent overheating of the sample 108. Positioning of the lamps 110 with respect to the sample 108 to distribute the emitted light on different points in the sample space is a further degree of freedom to achieve the required target illumination pattern.

In some examples, the optical head 102 may be a plastic molded part containing the illumination unit 105. For example, the reflectors 112 may be formed within the plastic molded part via injection molding and the lamps 110 may be assembled within the reflectors 110. The plastic molded part may further include an aperture (not shown in FIG. 1) configured to couple usable light rays (e.g., a portion of the scattered light from the sample 108) to the spectrometer 104. For example, the aperture may have a shape and a diameter configured to filter a first portion of the scattered light (e.g., unusable sample information) and to pass a second portion of the scattered light (e.g., usable sample information). In addition, the aperture may be configured to filter reflected light (e.g., reflected from the optical window 106) that contains no sample information.

In some examples, the optical head 102 may further optionally include a collection unit 115 (e.g., collection optics). For example, the collection optics 115 may include one or more optical coupling elements 114, such as one or more lenses, for collecting the usable scattered light 130 from the sample 108 and coupling the usable scattered light 130 into an input 125 of the spectrometer 104. In some examples, micro-optics 116, such as one or more coupling micromirrors, may be positioned at the input 125 to the spectrometer 104 to inject the light into the spectrometer 104. The spectrometer 104 may be, for example, a Fourier Transform infrared (FTIR) spectrometer. In some examples, the spectrometer 104 may include a Michelson interferometer or a Fabry-Perot interferometer. In the example shown in FIG. 1, the spectrometer 104 includes a Michelson interferometer 118 including a beam splitter 120, fixed mirror 122, and moveable mirror 124, which may be coupled, for example, to an electrostatic actuator. The interferometer 118 is configured to produce an interferogram that may be detected by a detector 126. For example, the detector 126 may be an InGaAs photo detector extended to the wavelength of 2600 nm to cover the Short Wave Infra-Red range (SWIR). The output of the detector 126 may be processed to obtain the spectrum of the detected light, which may then be utilized to identify various parameters associated with the sample 108.

In some examples, the spectrometer 104 may be implemented, for example, as a micro-electro-mechanical-systems (MEMS) spectrometer. As used herein, the term MEMS refers to the integration of mechanical elements, sensors, actuators and electronics on a common substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. One example of a MEMS element is a micro-optical component having a dielectric or metallized surface working in a reflection or refraction mode. Other examples of MEMS elements include actuators, detector grooves, and fiber grooves. In some examples, a MEMS spectrometer may include one or more micro-optical components (e.g., one or more reflectors or mirrors) that may be moveably controlled by a MEMS actuator. For example, the MEMS spectrometer may be fabricated using a deep reactive ion etching (DRIE) process on a silicon-on-insulator (SOI) substrate in order to produce the micro-optical components and other MEMS elements that are able to process free-space optical beams propagating parallel to the SOI substrate. For example, the beam splitter 120, fixed mirror 122, moveable mirror 124 and an electrostatic actuator (not shown for simplicity) may be fabricated onto an SOI MEMS chip. The MEMS actuator causes a displacement of the moveable mirror 124 that can enable a spectral resolution of 16 nm and 8 nm at 1550 nm.

Figure 2B:
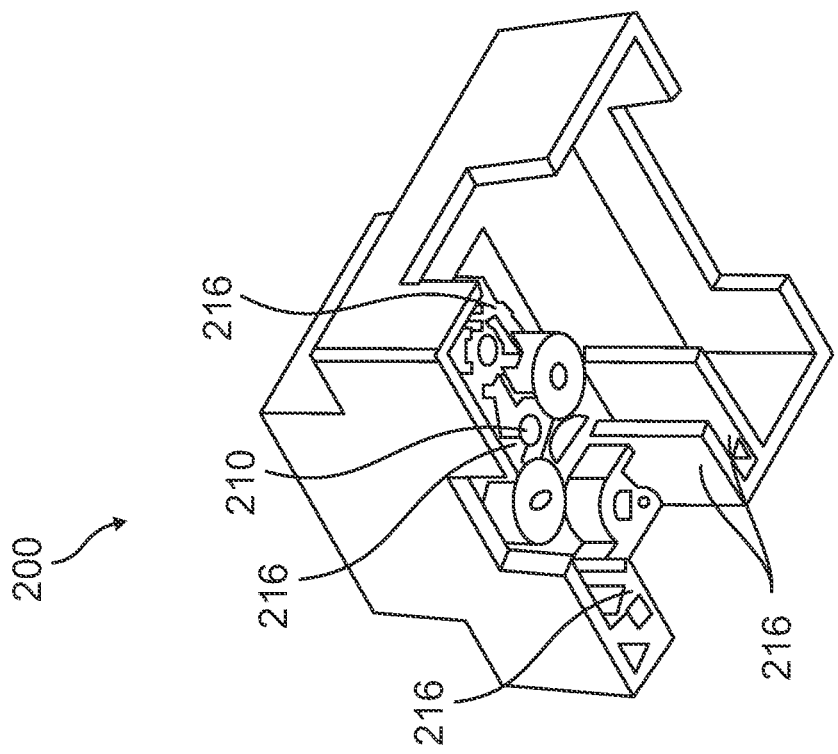
FIGS. 2A and 2B are diagrams illustrating an example of an optical head of an optical device according to some aspects.
Figure 2A:
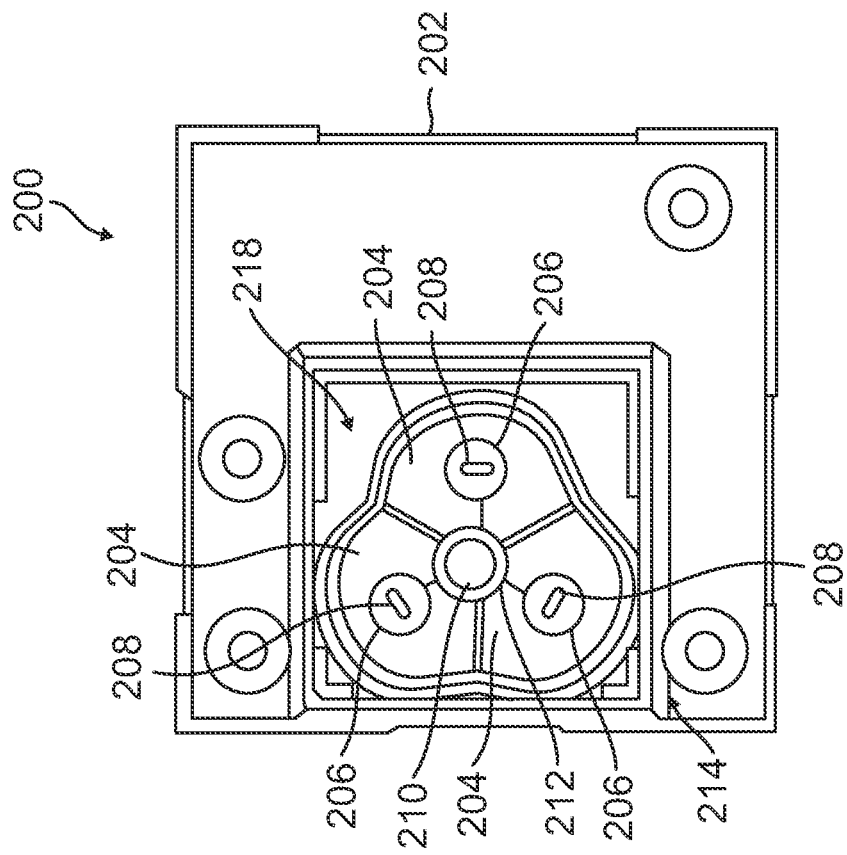

FIGS. 2A and 2B are diagrams illustrating an example of an optical head 200 of an optical device according to some aspects. FIG. 2A is a top view of the optical head 200, while FIG. 2B is a bottom perspective view of the optical head 200. The optical head 200 includes a plastic molded part 202 formed via, for example, injection molding. A plurality of reflectors 204 are formed within the plastic molded part 202 and coated with a metallic coating to provide high reflectivity above 95% in the near infrared range between 1000 nm and 3000 nm. The surface profile and curvature of the reflectors 204 may be selected to achieve a desired illumination pattern (e.g., optical spot size). In some examples, the plurality of reflectors 204 each have an optical surface with a surface roughness below 10 nm. For example, the optical surfaces of the reflectors 204 may be produced using high quality inserts that provide the desired surface roughness. In some examples, the plurality of reflectors 204 may be elliptical reflectors of dimensions selected to produce the desired optical spot size.

In addition, a plurality of lamp cups 206 (e.g., vertical cups) may be formed within the plastic molded part 202 inside the reflectors 204. Each lamp cup 206 may be configured to receive a respective lamp 208. For example, each reflector 204 may include a vertical lamp cup 206 where a lamp 208 may be inserted and fixed by adhesive. Thus, each lamp 208 may be assembled within a respective one of the reflectors 204. In the example shown in FIG. 2A, there are three lamps 208. However, the number of lamps 208 is variable based on the desired optical spot size. In some examples, the plastic material of the plastic molded part 202 is selected to withstand the high temperature of the lamps 208 (e.g., between 2000° K and 3000° K). In some examples, each lamp 208 may be a single filament incandescent lamp.

An aperture 210 is further formed within the plastic molded part 202. The aperture 210 may have a position, a shape, and a diameter configured to filter light containing unusable sample information or no sample information to maximize the coupling efficiency based on the desired optical spot size, as discussed above. For example, the aperture 210 dimensions may be selected to enhance the spectrometer visibility by limiting the acceptance angle of the direct current (DC) components of the interference signal, while maintaining the acceptance angle for the alternating current (AC) components of the interference signal. In some examples, as shown in FIG. 2A, the metallic coating on respective portions of the reflectors 204 within an area 212 adjacent to and surrounding the aperture 210 may be removed to reduce the error signal that corresponds to light rays that do not contain spectral information about the sample. In some examples, the area 212 devoid of metallic coating may be achieved by controlling the metallic deposition process on the plastic molded part 202, by removing the metallic coating in the area 212, or by removing the area 212 from the reflectors 204.

The optical head 200 may further include a frame 214 formed within the plastic molded part 202. The frame 214 may be configured to receive an optical window 218 on which a sample under test (not shown) may be placed. In some examples, the optical window 218 may be attached to the frame 214 by epoxy. In addition, the optical head 200 may further include a plurality of alignment pins 216 formed within the plastic molded part, as shown in FIG. 2B, to align the aperture 210 with an input to a spectrometer.

Figure 3B:
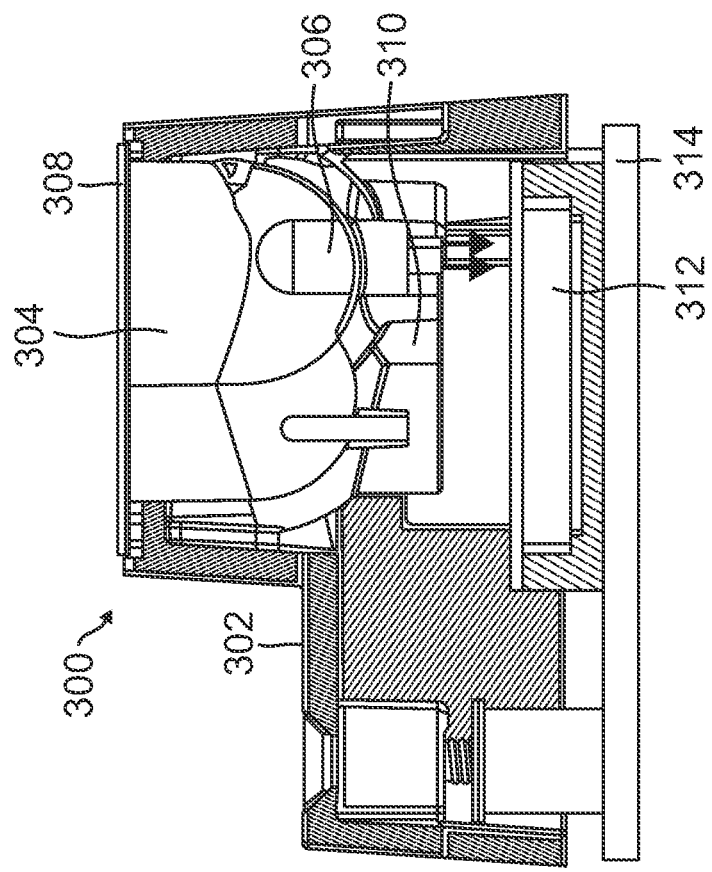
FIGS. 3A and 3B are diagrams illustrating an optical device including the optical head shown in FIGS. 2A and 2B according to some aspects.
Figure 3A:
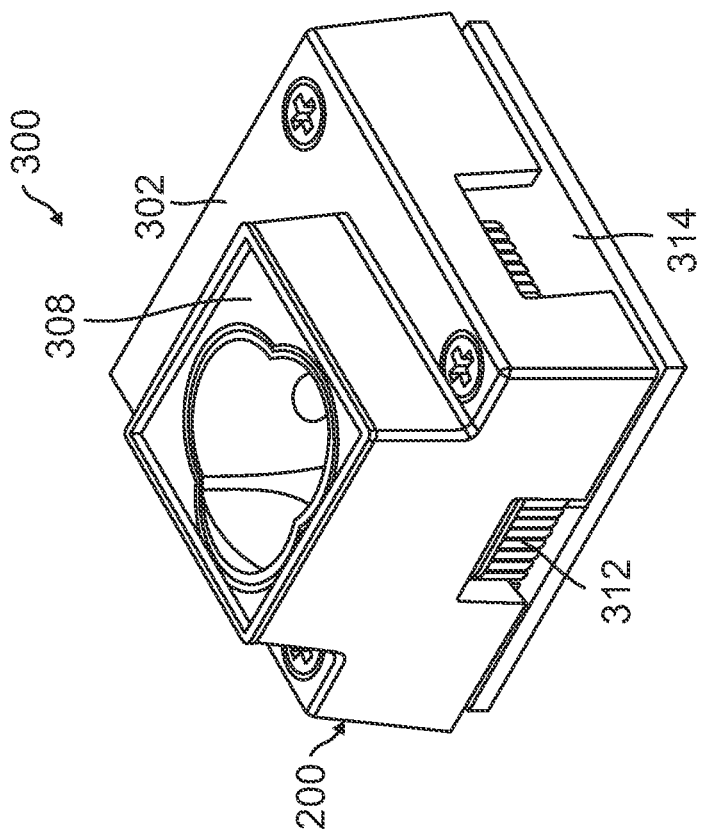

FIGS. 3A and 3B are diagrams illustrating an optical device 300 including the optical head 200 shown in FIGS. 2A and 2B according to some aspects. FIG. 3A is a top perspective view of the optical device 300, while FIG. 3B is a side view of the optical device 300. The optical head 200 includes a plastic molded part 302 having a plurality of reflectors 304 formed therein, as shown in FIG. 2A. In addition, the optical head 200 further includes a plurality of lamps 306, each being assembled within a respective one of the plurality of reflectors 304. An optical window 308 is positioned on the optical head 200 over the plurality of reflectors 304 and corresponding plurality of lamps 306. In addition, an aperture 310 within the plastic molded part 302 is aligned with an input to a spectrometer 312 to pass usable scattered light from a sample (not shown) on the optical window 308 to the spectrometer 312. The optical head 200 and spectrometer 312 may be assembled on a substrate 314 (e.g., a printed circuit board (PCB)) and the alignment pins (shown in FIG. 2B) on the optical head 200 may be configured to align the aperture 310 with the input to the spectrometer 312 during assembly on the substrate 314.

Figure 4B:
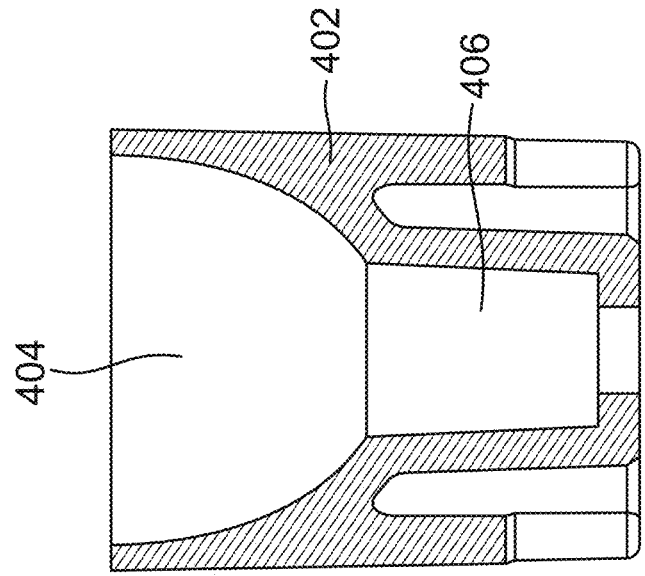
FIGS. 4A and 4B are diagrams illustrating another example of an optical head of an optical device according to some aspects.
Figure 4A:
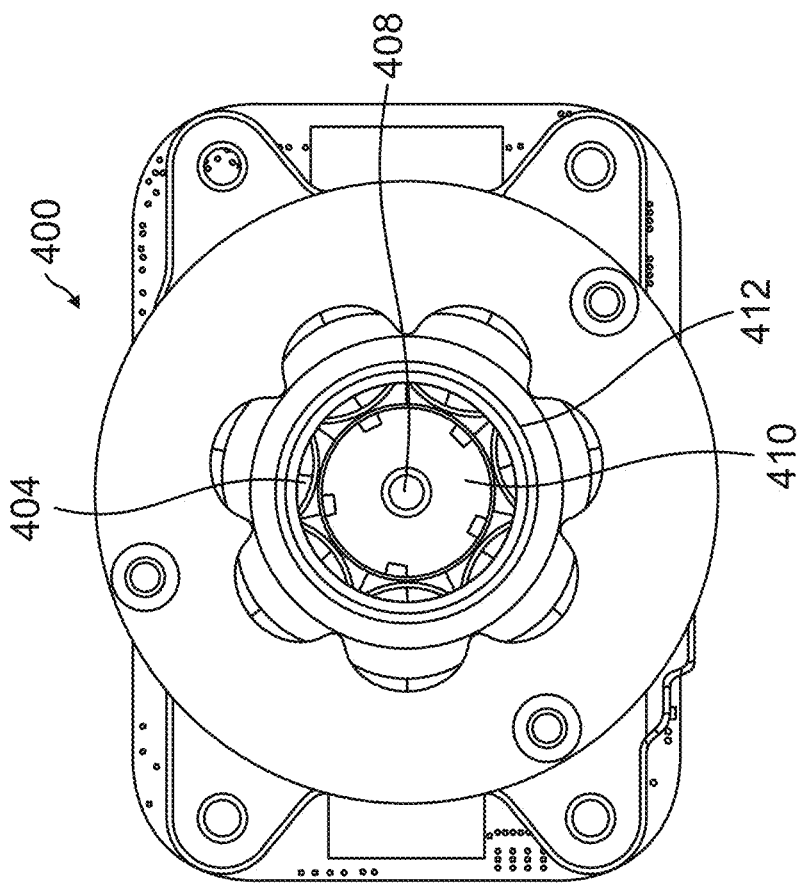

FIGS. 4A and 4B are diagrams illustrating another example of an optical head 400 of an optical device according to some aspects. FIG. 4A is a top view of the optical head 400, while FIG. 4B is a side view of various components of the optical head 400. The optical head 400 includes a plastic molded part 402 formed via, for example, injection molding. A plurality of reflectors 404 are formed within the plastic molded part 402 and coated with a metallic coating to provide high reflectivity. The surface profile and curvature of the reflectors 404 may be selected to achieve a desired illumination pattern (e.g., optical spot size). In some examples, the plurality of reflectors 404 each have an optical surface with a surface roughness below 10 nm. For example, the optical surfaces of the reflectors 404 may be produced using high quality inserts that provide the desired surface roughness. In some examples, the plurality of reflectors 404 may be elliptical reflectors of dimensions selected to produce the desired optical spot size.

In addition, a plurality of lamp cups 406 (e.g., vertical cups) may be formed within the plastic molded part 402 inside the reflectors 404. Each lamp cup 406 may be configured to receive a respective lamp (not specifically shown in FIG. 4A or 4B). For example, each reflector 404 may include a vertical lamp cup 406 where a lamp may be inserted and fixed by adhesive. In this example, the lamp axis may be aligned with the mechanical axis of the reflector 404. In the example shown in FIGS. 4A and 4B, there are seven lamps, each assembled within a respective one of the reflectors 404. However, the number of lamps is variable based on the desired optical spot size. In some examples, each lamp may be an incandescent lamp including dual filaments within the same glass envelope. In some examples, the two filaments are placed such that the ellipse foci is in the middle between them to decrease the alignment sensitivity for the lamp placement into the reflector 404. In some examples, the lamp glass includes a lens on the tip to collect the input light from the lamp and to direct the input light to the sample. In some examples, the position of the reflectors 404 is selected to produce a target illumination spot (e.g., a large optical spot size between 3 mm and 20 mm) on the sample with a target uniform intensity profile and low peak intensity value (e.g., peak intensity value below a threshold) to prevent overheating of the sample.

An aperture 408 is further formed within the plastic molded part 402. The aperture 408 may have a position, a shape, and a diameter configured to filter light containing unusable sample information or no sample information to maximize the coupling efficiency based on the desired optical spot size, as discussed above. The optical head 400 may further include a frame 412 formed within the plastic molded part 402. The frame 412 may be configured to receive an optical window 410 on which a sample under test (not shown) may be placed. In some examples, the optical window 410 may be attached to the frame 412 by epoxy. For example, the optical window 410 may be fixed with an adhesive that can provide sealing above IP65 rating. Although not shown in FIG. 4A or 4B, the optical head 400 may further include an optical coupling element (e.g., a lens) for collecting the scattered light from the sample and coupling the scattered light into an input of a spectrometer.

Figure 5:
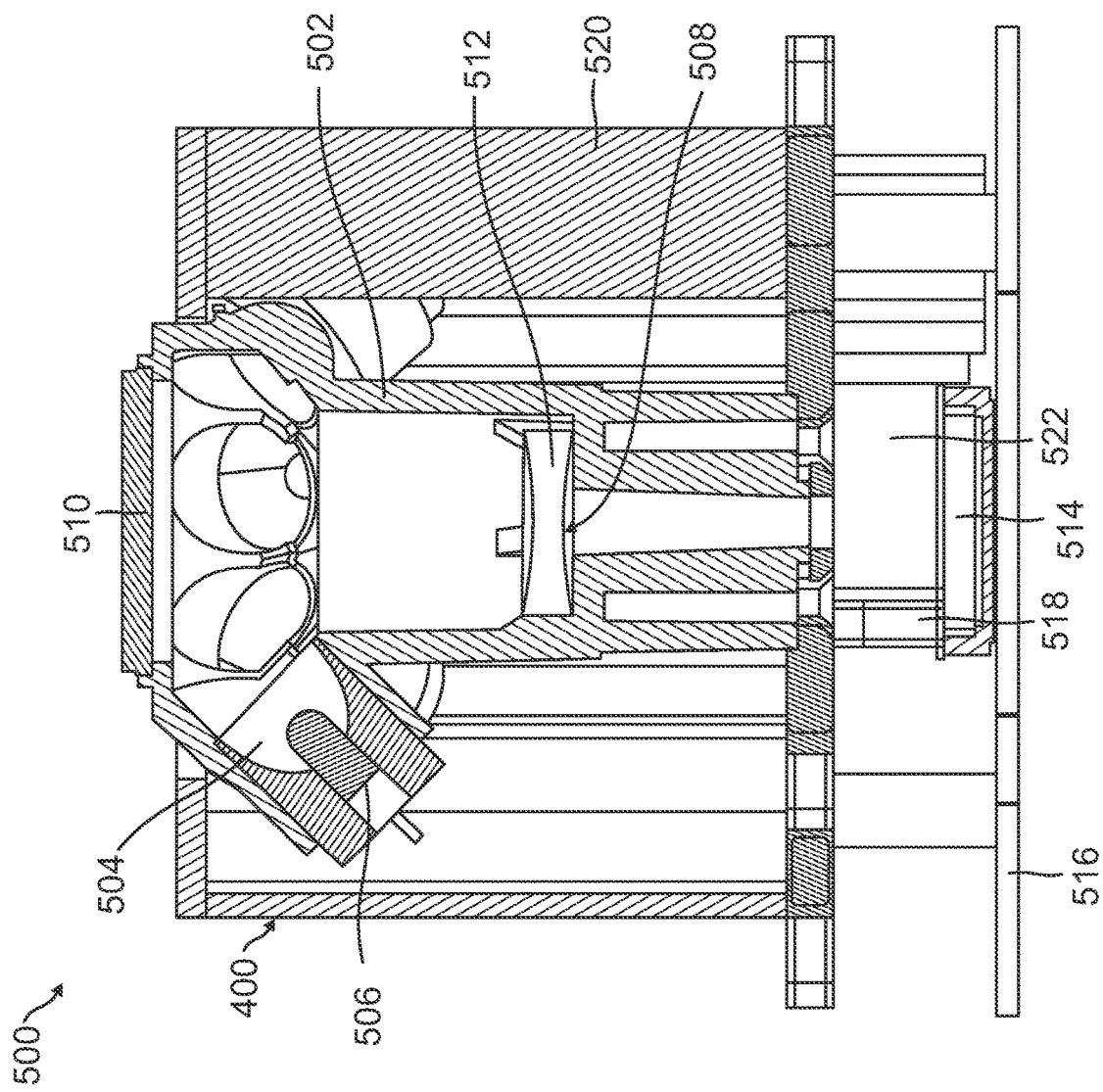
FIG. 5 is a diagram illustrating an example of an optical device including the optical head shown in FIGS. 4A and 4B according to some aspects.

FIG. 5 is a diagram illustrating an example of an optical device 500 including the optical head 400 shown in FIGS. 4A and 4B according to some aspects. The optical head 400 includes a plastic molded part 502 having a plurality of reflectors 504 formed therein, as shown in FIGS. 4A and 4B. In addition, the optical head 400 further includes a plurality of lamps 506 (e.g., seven lamps), each being assembled within a respective one of the plurality of reflectors 504. An optical window 510 is positioned on the optical head 400 over the plurality of reflectors 504 and corresponding plurality of lamps 506. In addition, the plastic molded part 502 further includes an optical coupling element (e.g., a concave lens) 512 and an aperture 508 aligned to an input to a spectrometer 514 to pass usable scattered light from a sample (not shown) on the optical window 510 to the spectrometer 514. In some examples, the focal length of the concave lens 512 may be selected to increase the acceptance angle of the spectrometer 514.

The optical head 400 and spectrometer 514 may be assembled on a substrate 516 (e.g., a printed circuit board (PCB)). Alignment pins 518 extending from the optical head 400 may be configured to align the aperture 508 with the input to the spectrometer 514 during assembly on the substrate 516. A heat sink 520 may further be coupled to the plastic molded part 502 and metallic pins 522 may be coupled to the heat sink to provide heat dissipation from the optical head 400 and from the spectrometer electrical components, as well as mechanical assembly.

Figure 6:
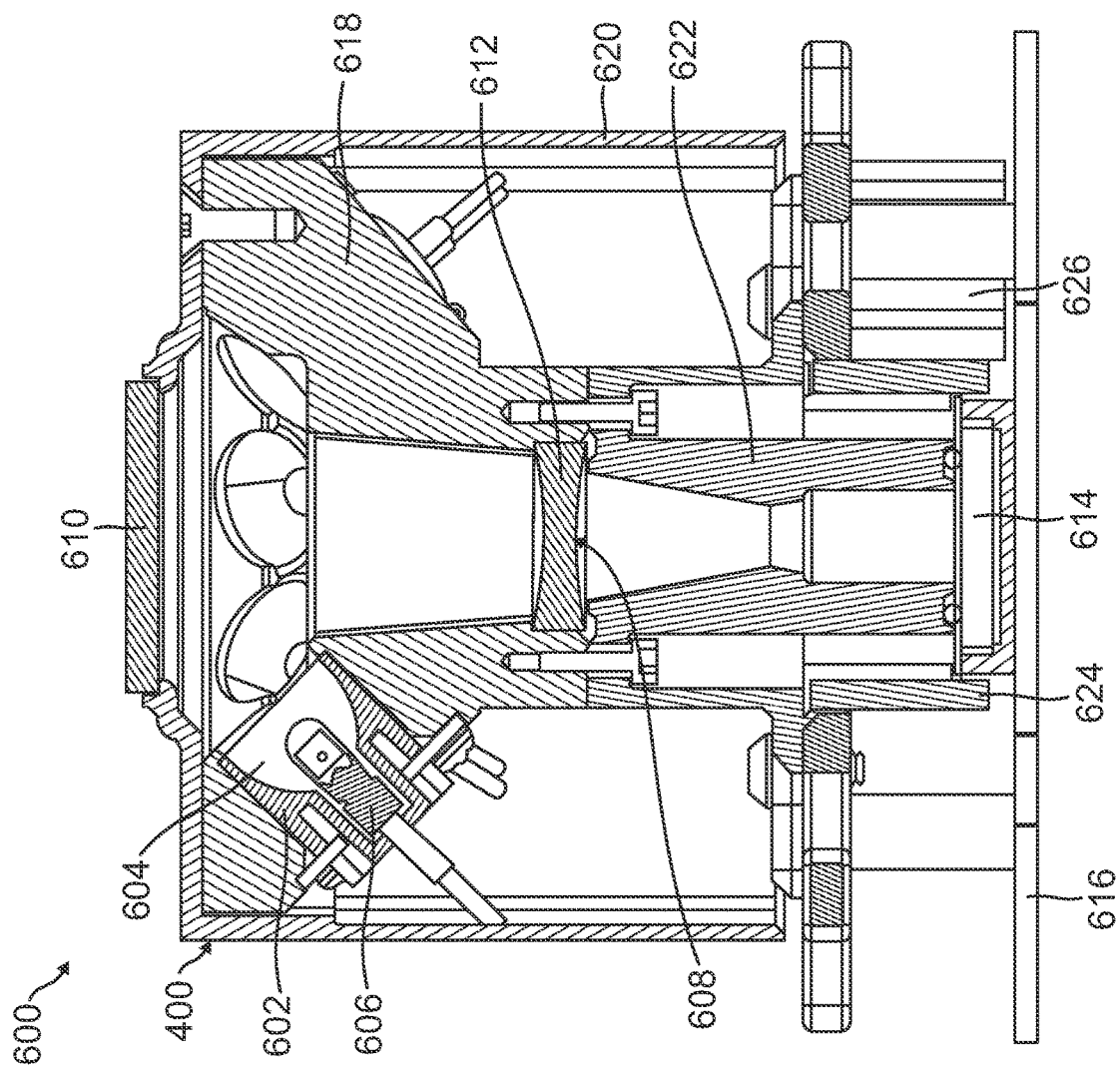
FIG. 6 is a diagram illustrating another example of an optical device including the optical head shown in FIGS. 4A and 4B according to some aspects.

FIG. 6 is a diagram illustrating another example of an optical device 600 including the optical head 400 shown in FIGS. 4A and 4B according to some aspects. The optical head 400 includes a plastic molded part 602 having a plurality of reflectors 604 formed therein, as shown in FIGS. 4A and 4B. In addition, the optical head 400 further includes a plurality of lamps 606 (e.g., seven lamps), each being assembled within a respective one of the plurality of reflectors 604. An optical window 610 is positioned on the optical head 400 over the plurality of reflectors 604 and corresponding plurality of lamps 606. In addition, the plastic molded part 602 further includes an optical coupling element (e.g., a concave lens) 612 and an aperture 608 aligned to an input to a spectrometer 614 to pass usable scattered light from a sample (not shown) on the optical window 610 to the spectrometer 614. In some examples, the focal length of the concave lens 612 may be selected to increase the acceptance angle of the spectrometer 614.

In the example shown in FIG. 6, the plastic molded part 602 is assembled into a metallic housing 618 to increase the heat dissipation to the ambient. In addition, the metallic housing 618 may include fins 620 configured as a heat sink. An additional plastic molded part 622 may be attached to the metallic housing 618 to prevent (or minimize) heat flow to the spectrometer. In addition, the additional plastic molded part 622 may be attached to the spectrometer 614 to provide air sealing of the spectrometer 614.

The additional plastic molded part 622 and spectrometer 614 may be assembled on a substrate 616 (e.g., a printed circuit board (PCB)). The additional plastic molded part 622 may further include alignment pins 624 configured to align the aperture 608 with the input to the spectrometer 614 during assembly on the substrate 616. Metallic pins 626 may be coupled to the heat sink 620 to provide heat dissipation from the optical head 400 and from the spectrometer electrical components, as well as mechanical assembly.

Figure 7A:
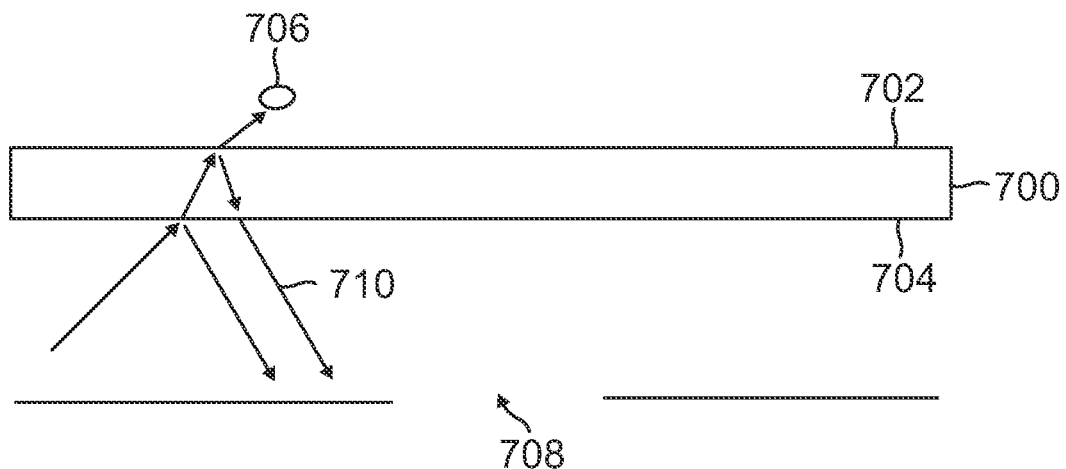
FIGS. 7A-7C are diagrams illustrating examples of light filtering by an aperture of the optical head according to some aspects.
Figure 7B:
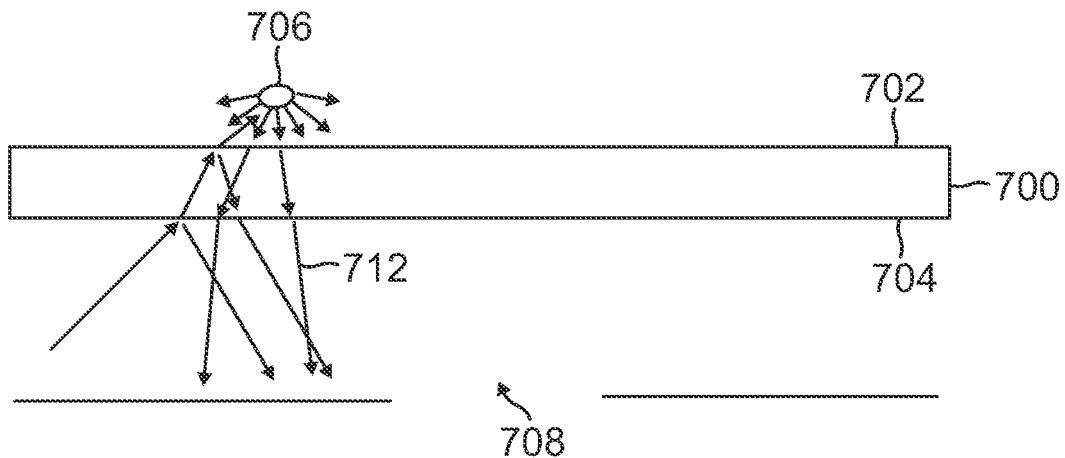
Figure 7C:
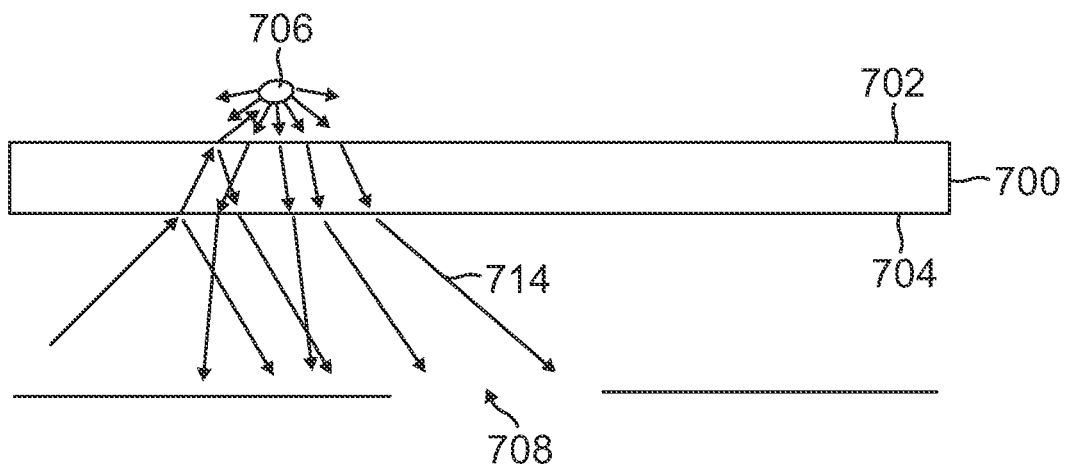

FIGS. 7A-7C are diagrams illustrating examples of light filtering by an aperture 708 of the optical head according to some aspects. As described herein, the aperture 708 is configured to limit the unwanted light rays that are coupled into the spectrometer. The unwanted light rays can be grouped into two main categories. Referring to FIG. 7A, the first group includes light rays 710 that are directly reflected from an optical window 700 (e.g., from an external surface 702 or an internal surface 704 of the optical window 700). This reflected light 710 contains no sample information.

Referring to FIG. 7B, the second group includes light rays 712 that are scattered from a sample 706 on the optical window 700, but do not contain usable sample information. For example, in Fourier-Transform spectrometers, there is a direct current (DC) part of the interference signal (e.g., produced by a Michelson interferometer) and an alternating current (AC) part of the interference signal. The DC part saturates the detector, limits the dynamic range of the spectrometer, and increases the noise. The presence of this second group of unwanted rays 712 is due to the sensitivity of the generated interference to the interfering rays' polarization, angles, and positions with respect to each other.

Therefore, as shown in FIGS. 7A and 7B, the aperture 708 can be configured to filter both the unwanted reflected light rays 710 and the light rays 712 that do not add to the AC part. In addition, as shown in FIG. 7C, the aperture 708 may further be configured to pass light rays 714 that contribute to the AC part of the interference signal. Thus, the aperture 708 is configured to filter a first portion of the scattered light 712 containing unusable sample information (e.g., a DC component of the scattered light) and to pass a second portion of the scattered light 714 containing usable sample information (e.g., an AC component of the scattered light). In addition, the aperture 708 is configured to filter reflected light 710 reflected directly from the optical window 700.

In some examples, the aperture 708 may increase the visibility of the spectrometer by two to three times. The aperture shape and diameter can be selected to remove the unwanted rays 710 and 712, while passing the desired rays 714. For example, the aperture shape may be as simple as a circle, but can also take a complicated shape to accurately remove the unwanted rays and minimally affect the AC useful part. Accurate modeling of the coupling of the spectrometer and the sample scattering profiles may be utilized to select the aperture design (e.g., shape and diameter). Moreover, the position of the aperture 708 with respect to the sample 706 and an optional coupling lens may be considered. For example, the presence of this aperture 708 may impose a minimum distance between the sample 706 and the lens (not shown) to allow for the separation of the different rays before filtering them spatially. The aperture design may also take into account the spectrometer acceptance angles (e.g., the acceptance angle for the useful AC part and the acceptance angle for the DC part). In some examples, the DC acceptance angle may be larger.

Figure 8B:
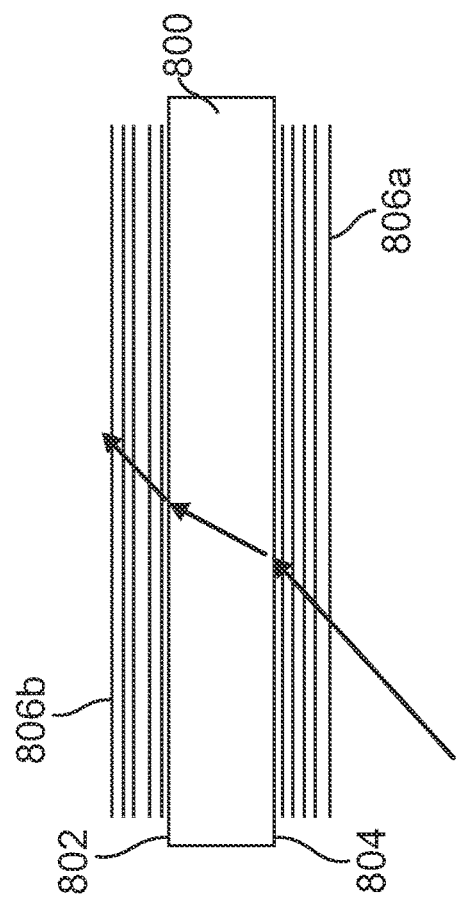
FIGS. 8A and 8B are diagrams illustrating examples of an optical window of an optical device according to some aspects.
Figure 8A:
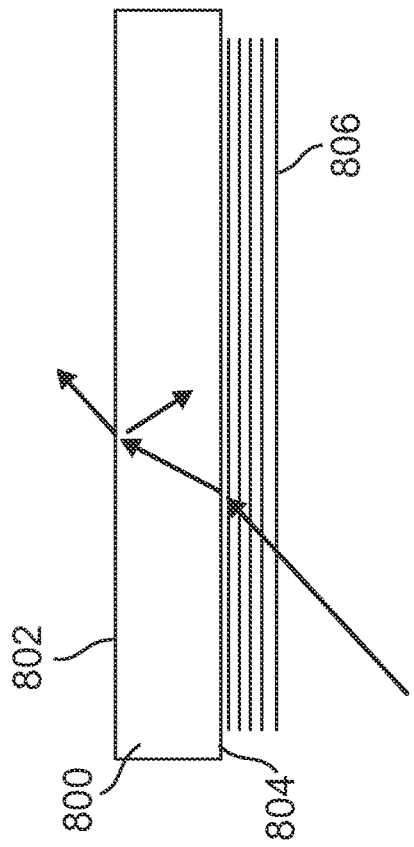

FIGS. 8A and 8B are diagrams illustrating examples of an optical window 800 of an optical device according to some aspects. The optical window 800 includes an external surface 802 on which a sample under test (not shown) may be placed and an internal surface 804 opposite the external surface 802. The optical window 800 allows light from the optical head of the optical device to pass through to the sample, and further allows scattered light from the sample to pass through back into the optical head.

To enable the optical device to measure different types of samples (e.g., grains, feed, soil, rocks, etc.) with different mechanical and chemical properties, the optical window 800 may have a hardness sufficient to remain scratch free from highly abrasive samples (e.g., a hardness greater than a threshold hardness), while also maintaining a high-quality optical interface. In addition, the optical window 800 may be designed to be highly transparent to increase the power delivered from the illumination unit to the sample in order to maintain the spectrometer signal to noise ratio and to minimize the lamp's power as much as possible, thus maintaining the overall electrical efficiency of the optical device.

However, a highly transparent optical window 800 may produce reflections (e.g., from the internal surface 804 or the external surface 802) that can have a negative impact on the spectrometer performance. These reflections may generate an error signal on the spectrometer detector. For certain applications, the error signal may be corrected with signal processing after data acquisition. However, these reflections may be partially dependent on the refractive index contrast between the window 800 and the sample, which can vary between sample types. This refractive index dependence can prevent signal processing compensation techniques from effectively removing the error signal. Moreover, the absorption of light reflections by the housing, fixtures, and the different components of the system may heat the different components, which can negatively affect the device performance either by misaligning some of the optical components due to thermal expansion or by increasing the noise of the electronic components of the spectrometer electrical circuits.

Therefore, as shown in FIGS. 8A and 8B, to reduce unwanted reflections, an antireflection coating 806 may be added to the optical window 800. The antireflection coating 806 may provide high transmittance across the operating wavelength range of the spectrometer. In some examples, as shown in FIG. 8A, the antireflection coating 806 may be applied on a single side (e.g., the internal surface 804) of the optical window 800. In other examples, as shown in FIG. 8B, antireflection coatings 806a and 806b may be added to both sides (e.g., the internal surface 804 and the external surface 802) of the optical window 800. Double sided antireflection coating greatly reduces the reflections from the window interface. However, the antireflection coating may not be hard enough to resist sample scratches. Therefore, single-sided antireflection coating 806 on only the internal surface 804, as shown in FIG. 8A, can be a good compromise between the unwanted reflection and scratch resistance.

Figure 9C:
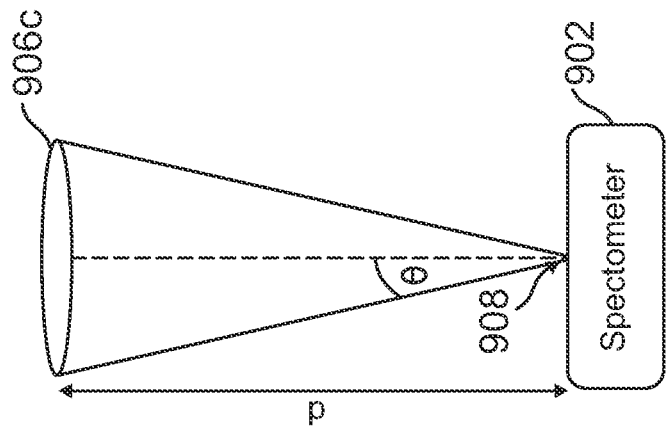
FIGS. 9A-9C are diagrams illustrating examples of spectrometer spot size according to some aspects.
Figure 9B:
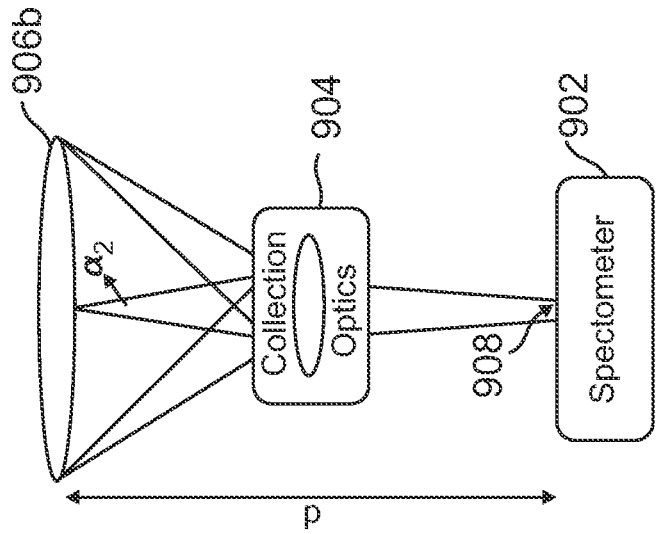
Figure 9A:
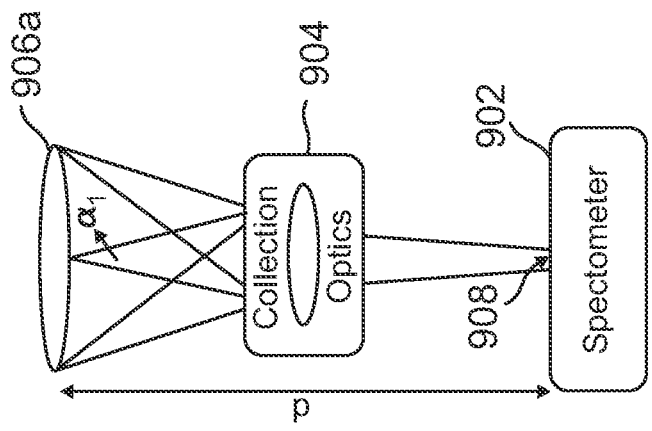

FIGS. 9A-9C are diagrams illustrating examples of spectrometer spot size according to some aspects. Referring to FIG. 9C, spectrometers 902 can be optically considered as an aperture 908 with certain area and acceptance angle $\theta$. The acceptance angle $\theta$ represents an angle of a head of a cone of light optically coupled into the spectrometer 902 from an illuminated spot 906 (e.g., 906c) on a sample. For example, light scattered from the sample may be optically coupled from the illuminated spot 906c towards the spectrometer 902. The throughput of the spectrometer 902 shown in FIG. 9C may be written as:

$$\text{Throughput} \propto \text{aperture diameter}^2 \times \sin^2(\theta). \quad \text{(Equation 1)}$$

The scattered light from the sample usually covers a large span of angles. If there is no lens between the sample and the spectrometer, the spot size (spot diameter 906c) seen by the spectrometer 901 will be proportional to the distance d between the sample interface and the spectrometer aperture 908 and the tangent of the acceptance angle $\theta$. If the distance d is large as compared to the diameter of the aperture 908, and the collected spot area of the illuminated spot 906c is much larger than the area of the aperture 908, the effective area (e.g., field of view) seen by the spectrometer may be approximated by the following relation:

$$\text{Spot diameter} = 2d \tan(\theta). \quad \text{(Equation 2)}$$

MEMS based spectrometers or any other type of miniaturized spectrometers usually have a limited aperture area and acceptance angle, which can be below 10 degrees. Inhomogeneous materials spectral measurements may not be compatible with these limited apertures. Therefore, as shown in FIGS. 9A and 9B, collection optics 904 (e.g., an optical coupling element) may be used to transform the field of view of the spectrometer 902 to match the required viewing area on the sample. This viewing area is application dependent and can range from below millimeters to tens of millimeters for large granules samples (such as plant seeds and soil for agriculture applications). Usually for smaller viewing areas, the original spectrometer's aperture 908 is enough to achieve the needed averaging. However, the larger the viewing area, the more complicated the design of the coupling optics.

Due to the optical throughput limit, increasing the spot area implies decreasing the angle span of the coupled rays from each point on the sample as illustrated in FIGS. 9A and 9B. The collected spot area 906*a* shown in FIG. 9A, is smaller than the collected spot 906*b* shown in FIG. 9B, which implies that the collected spot angles $\alpha_1$ are greater than $\alpha_2$ to maintain a constant throughput. Thus, to maintain an adequate level of illumination intensity on the sample, the total power radiated from the lamps may be increased to cover the larger spot area. This implies a trade-off between the spot size, lamps power and the total power coupled into the instrument. Since total power coupled affects the SNR, there is a trade-off between the spot size and the SNR assuming the same total radiated power from the lamps.

In some examples, the coupling optics 904 may be effectively modeled as a single concave lens. The concave lens effectively changes the acceptance angle θ to allow more tilted rays to be coupled and focused into the spectrometer aperture 908 as shown in FIGS. 9A and 9B. The focal length of the concave lens is determined by the distance d between the spectrometer aperture 908 and the sample, the diameter of the illuminated spot 906*a*/906*b*, and the acceptance angle θ of the spectrometer 902. The longer the allowed distance between the sample and the spectrometer, the larger the focal length will be. For most portable spectrometers, the total size is an important factor. Thus, a smaller focal length may be used to achieve the required spot area. In some examples, the needed focal length cannot be achieved with the available focal lengths for a single concave lens. Therefore, the coupling optics 904 may include multiple optical coupling elements (e.g., multiple lenses) to effectively achieve the needed shorter focal length.

Figure 10:
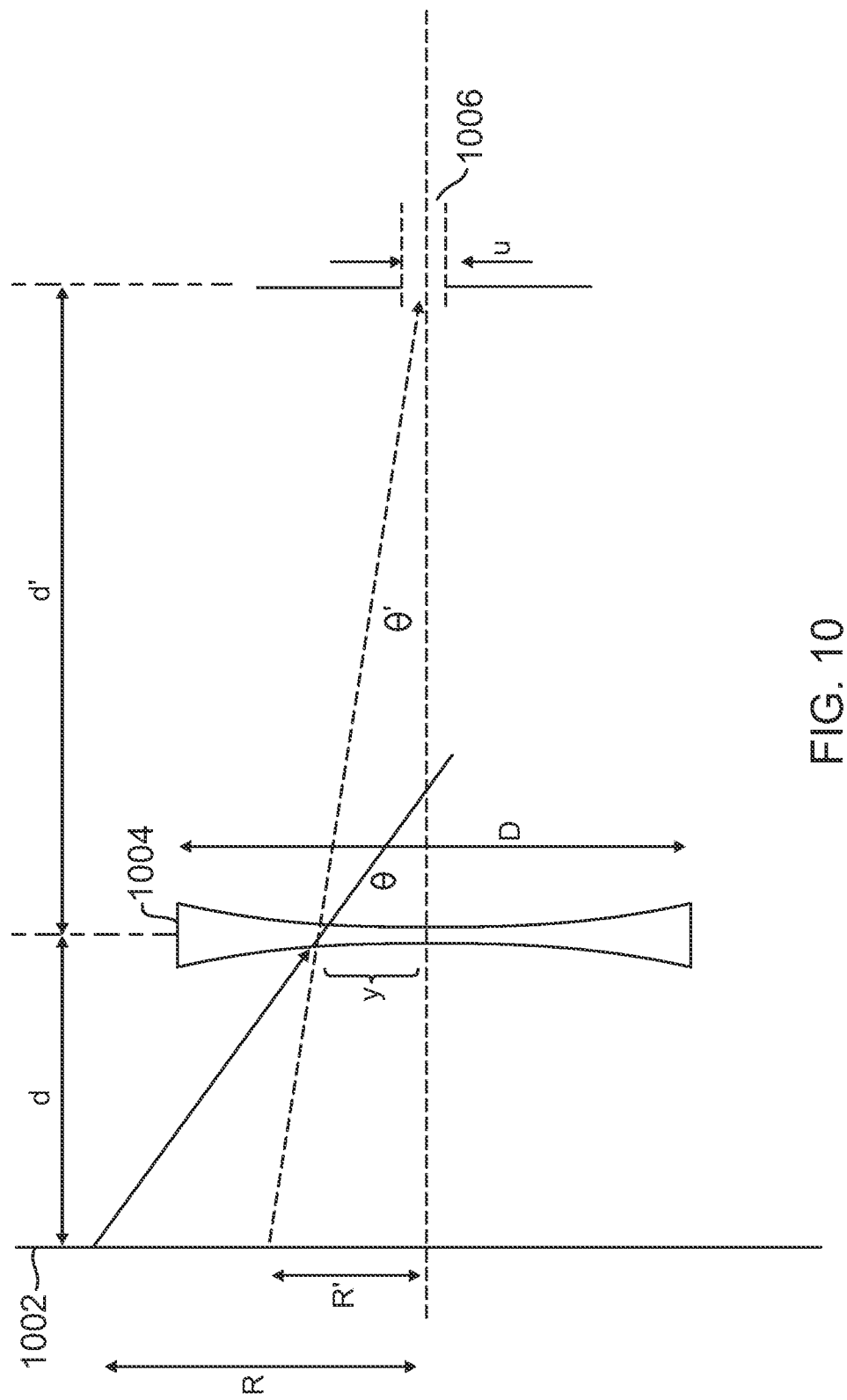
FIG. 10 is a diagram illustrating an example of an optical coupling element of the optical head according to some aspects.

FIG. 10 is a diagram illustrating an example of an optical coupling element 1004 of the optical head according to some aspects. In the example shown in FIG. 10, the optical coupling element 1004 includes a concave lens introduced between an optical window 1002 and a spectrometer aperture 1006. The spot radius of an illumination spot without the concave lens for a limited spectrometer aperture can be written as follows:

$$R'=(d+d')\tan(\theta'), \quad \text{(Equation 3)}$$

where θ' is the spectrometer acceptance angle. The actual spot radius may be higher, but Equation 3 is a good approximation if R'>u, where u represents the spectrometer input aperture diameter. Assuming a thin lens approximation, the following equations may be used to define the relationships between the different parameters:

$$\theta' = -\frac{1}{f}y + \theta \quad \text{(Equation 4)}$$

$$y = d'\tan(\theta') \quad \text{(Equation 5)}$$

$$R = y + d\tan(\theta) = d'\tan(\theta') + d\tan(\theta) \quad \text{(Equation 6)}$$

$$R - R' = d[\tan(\theta) - \tan(\theta')] \quad \text{(Equation 7)}$$

Equation 7 indicates an increase in the spot radius if θ>9', which can be achieved with a negative focal length system. The above Equations 4-7 may be used to generate design curves that includes the different parameters. For example, if the acceptance angle of the spectrometer is 6.6° and the total distance between the spectrometer aperture 1006 and the sample (optical window 1002) is 50 mm, the spot radius without the lens system is given by:

$$R'=(50 \text{ mm})\tan(6.6°)=5.79 \text{ mm} \quad \text{(Equation 8)}$$

In some examples, the minimum spot diameter to account for fabrication variations of the different system components and assembly tolerances may be 15 mm. In this example, the spot radius of Equation 8 is less than minimum spot diameter. Therefore, including a lens system (e.g., concave lens 1004) may increase the spot diameter to the desired optical spot size.

Figure 11:
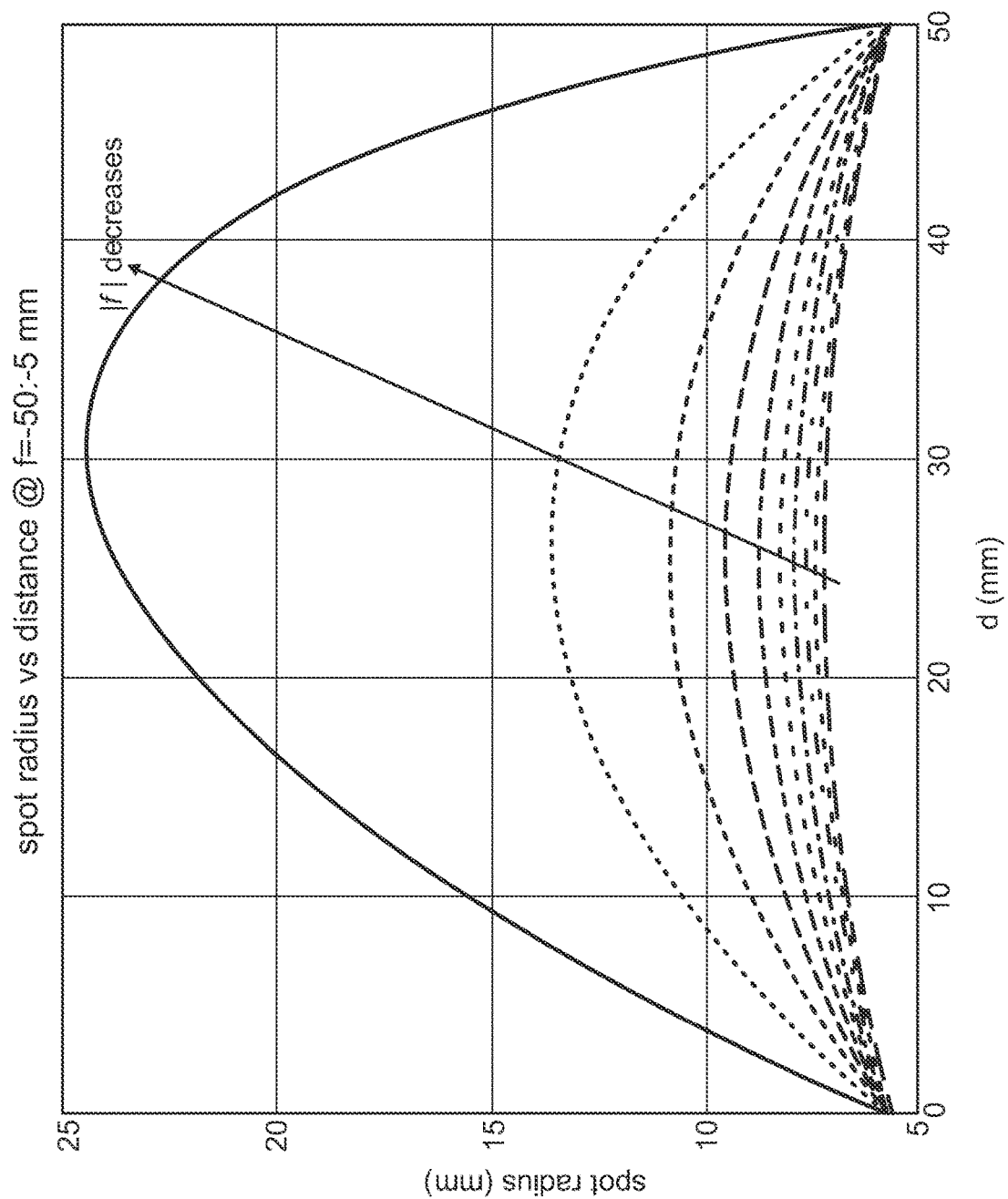
FIG. 11 is a diagram illustrating design curves for spot size based on distance between the sample and the optical coupling element according to some aspects.

FIG. 11 is a diagram illustrating design curves for spot size based on distance between the sample and the optical coupling element according to some aspects. The design curves are shown for different spot sizes with different lens positions from the sample, while keeping the total distance constant and equal to 50 mm for different focal lengths. As can be seen, increasing the curvature of the lens can achieve larger spot radius within the same dimensions. The generated family of curves provides potential choices for the focal length. However, the following constraint on the lens diameter for the conventional bi-convex lenses exists:

$$D \leq f \quad \text{(Equation 9)}$$

Accordingly, the maximum hitting position for the rays on the lens can be written as follows:

$$y = d'\tan(\theta') \leq D \leq f \quad \text{(Equation 10)}$$

This can eliminate some points on the generated family of curves. This condition can be relaxed if an aspheric lens is used. However, the same constraint may still apply with new relaxed limit. For practical reasons related to illumination, d should be kept above a threshold to avoid interfering with the illumination path. The curves shown in FIG. 11 may be generated for both the minimum anticipated angle of acceptance of the spectrometer and the maximum anticipated angle of acceptance of the spectrometer to provide more accurate representation of the unit-to-unit variation in the production.

The above calculations serve as an initial design point for the collection optics. For the illumination unit design, the optical power to be coupled into the spectrometer to achieve certain signal to noise ratio (e.g., provided by the spectrometer manufacturer) may be translated to a minimum level of intensity on the sample surface. In some examples, this translation may utilize the initial calculated design for the collection optics. The intensity can then be integrated on the sample area to be illuminated to calculate the total amount of the needed optical power for the system.

In an example, the total optical power on the sample to achieve the required signal to noise ratio of a given spectrometer may be approximately equal to 2 watts. As an initial reasonable assumption, 60% of the optical power emitted by the lamps may be collected and directed to the sample surface. In some examples, filament lamps may be utilized to provide wide spectral coverage over 1000 nm. In this example, filament radiation can be approximated by a black body radiation. Accordingly, not all the optical power is emitted in the operating wavelength range of the spectrometer. For example, a spectrometer may be operating in the NIR range from 1300 nm to 2600 nm. Integration can be made on the black body spectrum to calculate the effective part of the emission that falls within the operating range, referred to herein as the spectral efficiency. This can be performed for different black body temperatures in the range of 2000° K to 3000° K, assuming emissivity equal to one for simplicity. The calculated numbers are summarized in the following table:

TABLE 1

| Temperature (° K) | Spectral Band Radiance from 1300 nm to 2600 nm (W/m²/sr) | Spectral efficiency (%) |
|---|---|---|
| 2000 | 137129 | 47.5 |
| 2500 | 315289 | 44.7 |
| 3000 | 563695 | 38.6 |

As shown in Table 1, the lower the temperature, the better the spectral efficiency, but at the expense of lowered radiance falling within the operating spectral band. In an example, the middle point with spectral efficiency of 44.7% may be selected, and tungsten filament lamps with the corresponding middle point temperature may be utilized. The electrical to optical efficiency may be defined as a ratio between the total emitted optical power across the whole wavelength range to the total injected electrical power in the lamp. Considering an electrical to optical efficiency equal to 80%, the total electrical power needed to achieve the required signal to noise ratio may be calculated as:

$$\text{Total electrical power} = \frac{2 \text{ Watts}}{\text{illumination coupling efficiency} * \text{spectral efficiency} * \text{electrical to optical efficiency}} = \frac{2}{60\% * 44.7\% * 80\%} = 9.3 \text{ Watts}$$

(Equation 11)

In addition to selecting the lamp operating temperature, the outer dimensions of the lamps can be designed to be small enough to fit within small reflectors to reduce the overall structure size. Small lenses can further be used to couple the light from the front side of the lamp to the sample, while reflectors cover the sides.

In an example, seven lamps, each with rating equal to 1.5 Watts may be used in the optical device shown in FIGS. 4-6. Each lamp may include two filaments assembled within a glass envelope. The filaments may operate at a temperature of 2450° K.

After selecting the number of lamps and their power rating, the optical head may be designed to maximize the coupling from the filaments to the sample. For example, an estimate for the minimum distance from the sample that the lamps and reflectors may be placed may be calculated.

Figure 12:
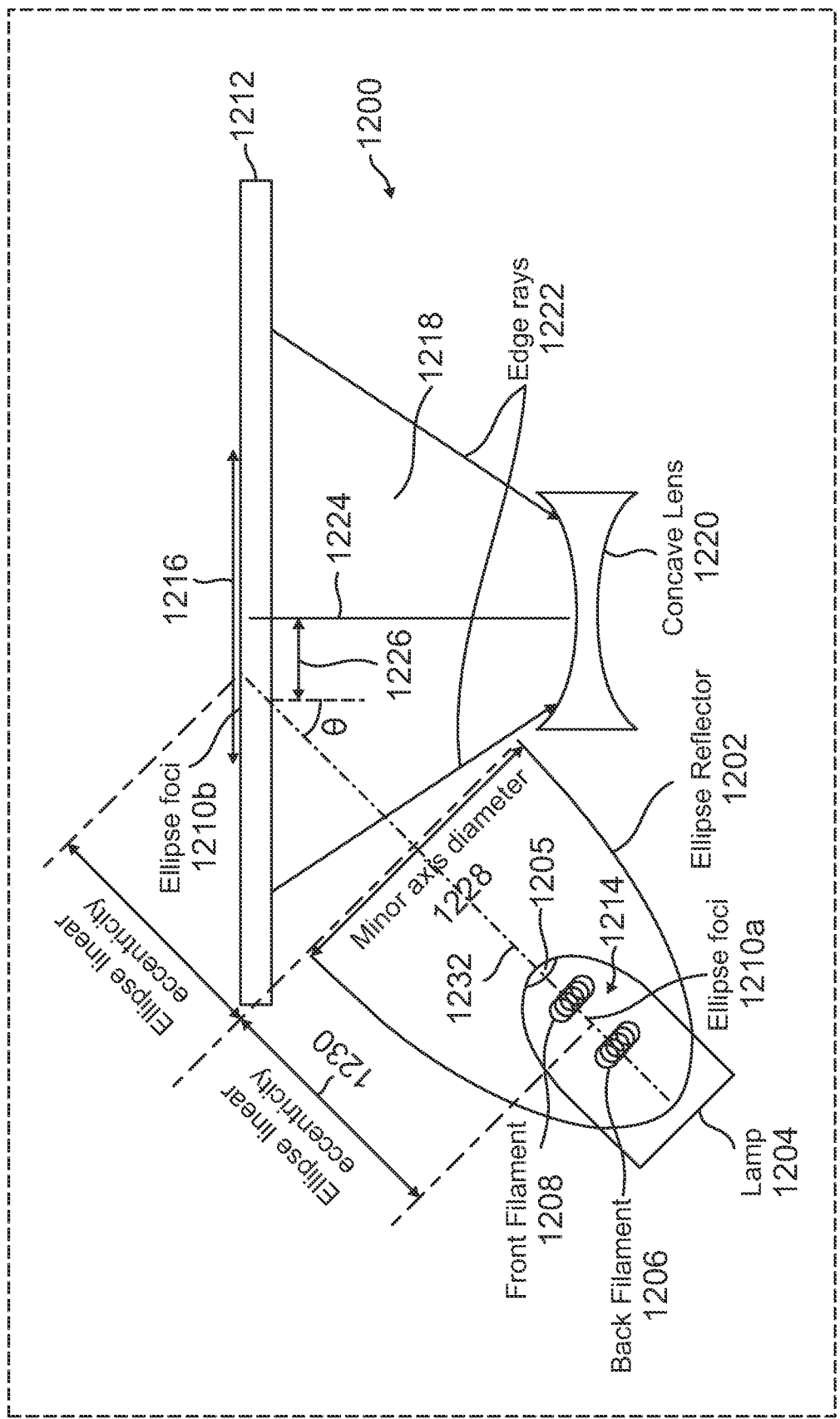
FIG. 12 is a diagram illustrating an example configuration of various components of the optical head according to some aspects.

FIG. 12 is a diagram illustrating an example configuration of various components of an optical head 1200 of an optical device that may be used to estimate the minimum distance according to some aspects. The optical head 1200 includes a plurality of reflectors 1202 (one of which is shown for convenience), a corresponding plurality of lamps 1204 (one of which is shown for convenience), and an optical coupling element (e.g., concave lens) 1220. Each lamp 1204 includes two filaments (e.g., back filament 1206 and front filament 1208) within a glass envelope 1214. A hole may be made in the reflector 1202 to fix the glass envelope 1214 and for electrical connections to the lamp 1204. In some examples, each lamp 1204 may further include a small lens 1205 on the tip to collect the input light from the lamp 1204 and to direct the input light to a sample on an optical window 1212 of the optical device.

Free space 1218 between the sample (e.g., the optical window 1212 on which the sample may be placed) and the optical coupling element 1220 may be defined within the optical head 1200 to avoid blocking the scattered light from the sample. This space 1218 can be calculated with knowledge of the edge rays 1222 that fall within the lens acceptance emitted from the sample surface. Then, given a target spot area 1216 (e.g., target spot size) of 10 mm to 15 mm, and assuming an axis 1232 of the reflector 1202 is inclined with respect to an optical axis 1224 of the concave lens 1220 by 45°, the minimum distance can be estimated as 5 mm from basic geometrical calculations. The calculated minimum distance provides a target for the reflectors 1202 and lenses 1205 around the filaments 1206 and 1208 to refocus the light at that distance.

Based on the minimum distance, a curvature of each of the reflectors 1202 may be designed to refocus the filament light which is emitted in all directions to the sample. In the example shown in FIG. 12, the reflector 1202 has an elliptical curvature. Elliptical reflectors 1202 collect all the light emitted from one foci (e.g., ellipse foci 1210a) to the other foci (e.g., ellipse foci 1210b). Thus, the lamp 1204 can be placed at one of the foci 1210a (e.g., the ellipse foci 1210a is between the dual filaments 1206 and 1208) and the sample point can be placed at the other foci 1210b, as shown in FIG. 12. In some examples, an ellipse linear eccentricity 1230 of the reflector 1202 may be at least 5 mm. In addition, a minor axis diameter 1228 of the reflector 1202 is at least as large as a diameter of the lamp 1204. For example, if the glass envelope 1205 of the lamp 1204 has a diameter of 3.5 mm, the minor axis diameter 1228 is at least 3.5 mm. However, sufficient area should be present around the lamp 1204 to have effective focusing effect for the reflector 1202. Accordingly, the minor axis diameter may be constrained to be at least double the lamp glass diameter (e.g., 7 mm).

The optical axis 1224 may further correspond to a central axis of the optical device aligned with the aperture and an input to the spectrometer. To achieve a large illumination spot 1216 (e.g., 3 mm to 20 mm), the reflectors 1202 with lamps 1204 may be placed at a position (e.g., shift 1226) and angle θ from the central axis 1224 to produce the free space 1218 and achieve the targeted illumination spot 1216 on the sample at the estimated minimum distance from the sample. In addition, each of the plurality of reflectors 1202 may further be oriented with respect to the central axis 1224 to achieve a target uniform intensity profile of the illumination spot 1216 on the sample with a peak intensity value less than a threshold (e.g., to prevent overheating of the sample). Although FIG. 12 illustrates a single lamp 1204 with reflector 1202, it should be understood that other lamps may be placed at the same position with respect to the sample distributed on a circle perimeter.

The uniformity on a sample can be calculated by adding several annular detectors with successive radii and calculating each annulus intensity. The uniformity is hence defined as the standard deviation of all annulus intensity divided to the mean intensity value of all annuluses as follows:

$$\text{Uniformity} = \frac{STDV \text{ (Annulus Intensity)}}{\text{mean (Annulus Intensity)}}$$

(Equation 12)

The peak intensity value of the illumination spot is an indication to have lower sample heating. The design is chosen to achieve low peak intensity value and uniformity at the certain illumination power on sample.

Figures 13A, 13B, 13C:
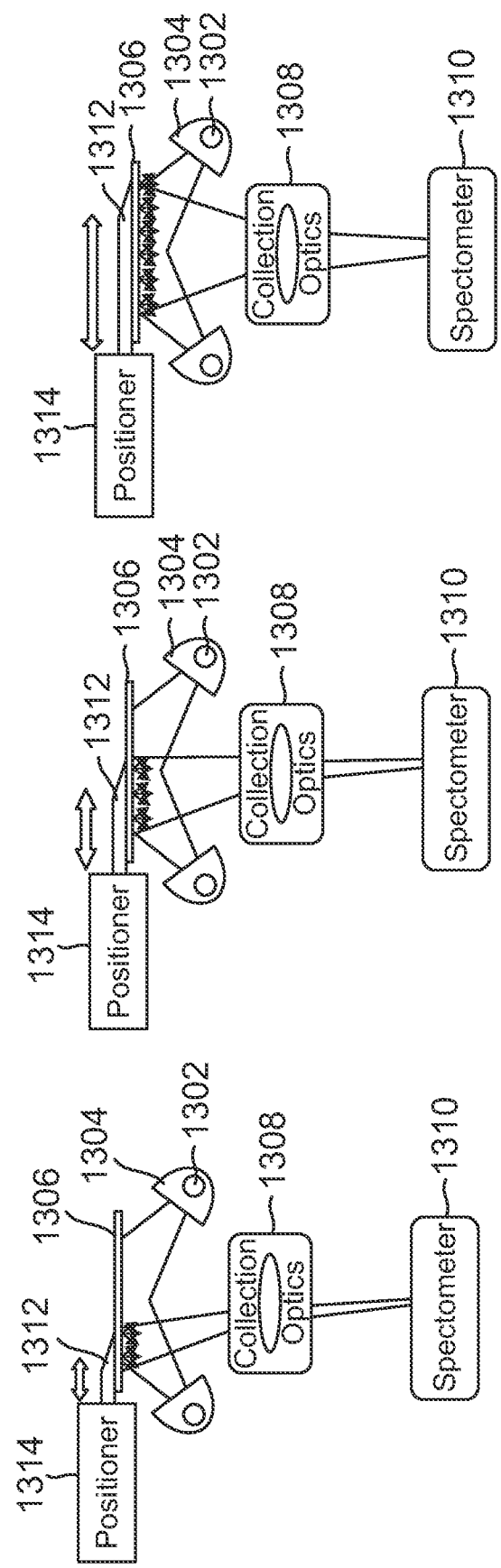
FIGS. 13A-13C are diagrams illustrating an example process for measuring the spot size of a spectrometer according to some aspects.

FIGS. 13A-13C are diagrams illustrating an example process for measuring the spot size of a spectrometer of an optical device according to some aspects. In the example shown in FIGS. 13A-13C, the optical device includes an illumination unit including a plurality of lamps 1302 and a corresponding plurality of reflectors 1304, each surrounding one of the plurality of lamps 1302. The optical device further includes an optical window 1306 on which a sample may be placed, collection optics 1308 (e.g., one or more optical coupling elements, such as lenses), and a spectrometer 1310. The spot size of the spectrometer 1310 may be measured, for example, using a knife-edge technique in which a high scattering reference material 1312 (e.g., polytetrafluoroethylene (PTFE)) may be mounted to a moving stage controlled by a positioner 1314. The spectrometer 1310 may then be configured to measure the target spot diameter based on the power detected by the spectrometer 1310 with respect to a lateral position of the moving reference sample 1312 on the optical window 1306. For example, initially, the knife edge is located away from the optical window 1306, and therefore, the reference sample 1312 is not reflecting any power to the spectrometer aperture. Then, as shown in FIGS. 13A-13C, the positioner 1314 can move the knife edge with constant linear steps capturing the power at each step until the reference sample 1312 covers the entire illumination spot, at which the power saturates, thus giving the cumulative power versus displacement. By differentiating the cumulative power, the intensity profile may be obtained. The spot diameter can then be calculated by fitting the intensity profile to a Gaussian profile (or other type of fitting) and defining the spot size as the beam diameter that contains 90% of the reflected power. It should be understood that other methods may also be used to calculate the spot size.

The following provides an overview of examples of the present disclosure.

Example 1: An optical device, comprising: an optical head comprising a plastic molded part, an aperture formed within the plastic molded part, a plurality of reflectors formed within the plastic molded part around the aperture, and a plurality of lamps, each lamp of the plurality of lamps being assembled within a respective one of the plurality of reflectors; an optical window positioned on the optical head, the optical window configured to receive a sample, to pass input light from the plurality of lamps to the sample, and to pass scattered light scattered from the sample towards the aperture, the aperture comprising a shape and a diameter configured to filter a first portion of the scattered light and to pass a second portion of the scattered light, the first portion of the scattered light containing unusable sample information; and a spectrometer configured to receive the second portion of the scattered light at an input thereof and to obtain a spectrum of the sample based on the second portion of the scattered light.

Example 2: The optical device of example 1, wherein the unusable sample information comprises a direct current (DC) component of the scattered light, and the aperture is configured to limit a first spectrometer acceptance angle of the DC component of the scattered light and maintain a second spectrometer acceptance angle of an alternating current (AC) component of the scattered light.

Example 3: The optical device of example 1 or 2, wherein the aperture is further configured to filter reflected light reflected directly from the optical window.

Example 4: The optical device of any of examples 1 through 3, wherein the plastic molded part comprises a metallic coating on the plurality of reflectors.

Example 5: The optical device of example 4, wherein the metallic coating on respective portions of the plurality of reflectors adjacent the aperture is removed.

Example 6: The optical device of any of examples 1 through 5, wherein the optical window comprises an anti-reflection coating on an internal surface thereof.

Example 7: The optical device of example 6, wherein the optical window further comprises an additional antireflection coating on an external surface thereof, the external surface having the sample placed thereon.

Example 8: The optical device of any of examples 1 through 7, wherein the plurality of reflectors each have an optical surface with a surface roughness below 10 nm.

Example 9: The optical device of any of examples 1 through 8, wherein the optical head further comprises alignment pins configured to align the aperture with the input to the spectrometer.

Example 10: The optical device of any of examples 1 through 9, wherein the optical head comprises a central axis aligned with the aperture and the input to the spectrometer, and wherein each of the plurality of reflectors is oriented at an angle and position with respect to the central axis to produce an illumination spot comprising a target spot diameter on the sample.

Example 11: The optical device of example 10, wherein each of the plurality of reflectors is further oriented with respect to the central axis to achieve a target uniform intensity profile of the illumination spot on the sample with a peak intensity value less than a threshold.

Example 12: The optical device of example 10 or 11, wherein the spectrometer is configured to measure the target spot diameter based on a power detected by the spectrometer with respect to a lateral position of a moving reference sample on the optical window.

Example 13: The optical device of any of examples 1 through 12, wherein each of the plurality of reflectors comprises an elliptical reflector.

Example 14: The optical device of example 13, wherein each of the plurality of lamps comprises a glass envelope and dual filaments within the glass envelope placed such that an ellipse foci is between the dual filaments.

Example 15: The optical device of example 14, wherein the glass envelope comprises a lens to collect the input light and direct the input light to the sample.

Example 16: The optical device of any of examples 13 through 15, wherein a lamp axis of each of the plurality of lamps is aligned with a mechanical axis of each of the plurality of reflectors.

Example 17: The optical device of any of examples 1 through 16, further comprising: a heat sink coupled to the plastic molded part; and metallic pins coupled to the heat sink to provide heat dissipation.

Example 18: The optical device of example 17, further comprising a metallic housing comprising the plastic molded part.

Example 19: The optical device of example 18, wherein the metallic housing comprises a plurality of fins configured as the heat sink.

Example 20: The optical device of example 18 or 19, further comprising: an additional plastic molded part attached to the metallic housing and the spectrometer, the additional plastic molded part comprising alignment pins configured to align the aperture with the input to the spectrometer.

Example 21: The optical device of any of examples 1 through 20, further comprising: an optical coupling element configured to couple the second portion of the scattered light through the aperture to the input to the spectrometer.

Example 22: The optical device of example 21, wherein the optical coupling element comprises a concave lens.

Example 23: The optical device of example 21 or 22, wherein a focal length of the optical coupling element is selected to increase an acceptance angle of the spectrometer.

Example 24: The optical device of any of examples 1 through 23, wherein the plastic molded part comprises a frame surrounding the plurality of reflectors, the plurality of lamps, and the aperture, and wherein the optical window is fixed to the frame.

Example 25: The optical device of any of examples 1 through 24, wherein the plurality of lamps comprises three lamps or seven lamps.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13C may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13C may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. An optical device, comprising:
   an optical head comprising a plastic molded part, an aperture formed within the plastic molded part, a plurality of reflectors formed within the plastic molded part around the aperture, and a plurality of lamps, each lamp of the plurality of lamps being assembled within a respective one of the plurality of reflectors;
   an optical window positioned on the optical head, the optical window configured to receive a sample, to pass input light from the plurality of lamps to the sample, and to pass scattered light scattered from the sample towards the aperture, the aperture comprising a shape and a diameter configured to filter a first portion of the scattered light and to pass a second portion of the scattered light, the first portion of the scattered light containing unusable sample information; and
   a spectrometer configured to receive the second portion of the scattered light at an input thereof and to obtain a spectrum of the sample based on the second portion of the scattered light;
   wherein the unusable sample information comprises a direct current (DC) component of the scattered light, and the aperture is configured to limit a first spectrometer acceptance angle of the DC component of the scattered light and maintain a second spectrometer acceptance angle of an alternating current (AC) component of the scattered light.

2. The optical device of claim 1, wherein the aperture is further configured to filter reflected light reflected directly from the optical window.

3. The optical device of claim 1, wherein the plastic molded part comprises a metallic coating on the plurality of reflectors.

4. The optical device of claim 3, wherein the metallic coating on respective portions of the plurality of reflectors adjacent the aperture is removed.

5. The optical device of claim 1, wherein the optical window comprises an antireflection coating on an internal surface thereof.

6. The optical device of claim 5, wherein the optical window further comprises an additional antireflection coating on an external surface thereof, the external surface having the sample placed thereon.

7. The optical device of claim 1, wherein the plurality of reflectors each have an optical surface with a surface roughness below 10 nm.

8. The optical device of claim 1, wherein the optical head further comprises alignment pins configured to align the aperture with the input to the spectrometer.

9. The optical device of claim 1, wherein the optical head comprises a central axis aligned with the aperture and the input to the spectrometer, and wherein each of the plurality of reflectors is oriented at an angle and position with respect to the central axis to produce an illumination spot comprising a target spot diameter on the sample.

10. The optical device of claim 9, wherein each of the plurality of reflectors is further oriented with respect to the central axis to achieve a target uniform intensity profile of the illumination spot on the sample with a peak intensity value less than a threshold.

11. The optical device of claim 9, wherein the spectrometer is configured to measure the target spot diameter based on a power detected by the spectrometer with respect to a lateral position of a moving reference sample on the optical window.

12. The optical device of claim 1, wherein each of the plurality of reflectors comprises an elliptical reflector.

13. The optical device of claim 12, wherein each of the plurality of lamps comprises a glass envelope and dual filaments within the glass envelope placed such that an ellipse foci is between the dual filaments.

14. The optical device of claim 13, wherein the glass envelope comprises a lens to collect the input light and direct the input light to the sample.

15. The optical device of claim 12, wherein a lamp axis of each of the plurality of lamps is aligned with a mechanical axis of each of the plurality of reflectors.

16. The optical device of claim 1, further comprising:
a heat sink coupled to the plastic molded part; and
metallic pins coupled to the heat sink to provide heat dissipation.

17. The optical device of claim 16, further comprising a metallic housing comprising the plastic molded part.

18. The optical device of claim 17, wherein the metallic housing comprises a plurality of fins configured as the heat sink.

19. The optical device of claim 17, further comprising:
an additional plastic molded part attached to the metallic housing and the spectrometer, the additional plastic molded part comprising alignment pins configured to align the aperture with the input to the spectrometer.

20. The optical device of claim 1, further comprising:
an optical coupling element configured to couple the second portion of the scattered light through the aperture to the input to the spectrometer.

21. The optical device of claim 20, wherein the optical coupling element comprises a concave lens.

22. The optical device of claim 20, wherein a focal length of the optical coupling element is selected to increase an acceptance angle of the spectrometer.

23. The optical device of claim 1, wherein the plastic molded part comprises a frame surrounding the plurality of reflectors, the plurality of lamps, and the aperture, and wherein the optical window is fixed to the frame.

24. The optical device of claim 1, wherein the plurality of lamps comprises three lamps or seven lamps.

* * * * *